US005535587A

United States Patent [19]

Tanaka et al.

[11] Patent Number: 5,535,587

[45] Date of Patent: Jul. 16, 1996

[54] HYDRAULIC DRIVE SYSTEM

[75] Inventors: Hirohisa Tanaka, Tokyo; Morio Oshina, Ibaraki-ken; Takashi Kanai, Kashiwa; Atsushi Tanaka, Tsuchiura, all of Japan

[73] Assignee: Hitachi Construction Machinery Co., Ltd., Tokyo, Japan

[21] Appl. No.: 108,630

[22] PCT Filed: Feb. 18, 1993

[86] PCT No.: PCT/JP93/00197

§ 371 Date: Aug. 30, 1993

§ 102(e) Date: Aug. 30, 1993

[87] PCT Pub. No.: WO93/16285

PCT Pub. Date: Aug. 19, 1993

[30] Foreign Application Priority Data

Feb. 18, 1992 [JP] Japan .................................... 4-030845

[51] Int. Cl.[6] ....................................................... F16D 31/02

[52] U.S. Cl. ................................................. 60/427; 60/450

[58] Field of Search ............................. 60/327, 368, 328, 60/427, 450

[56] References Cited

U.S. PATENT DOCUMENTS

| | | | |
|---|---|---|---|
| 3,727,403 | 4/1973 | Andersson et al. | 60/427 |
| 4,281,584 | 8/1981 | Onken et al. | 91/417 R |
| 4,617,854 | 10/1986 | Kropp . | |
| 4,712,376 | 12/1987 | Hadank et al. . | |
| 4,744,218 | 5/1988 | Edwards et al. | 60/368 |
| 5,428,958 | 7/1995 | Stenlund | 60/327 |

FOREIGN PATENT DOCUMENTS

| | | |
|---|---|---|
| 52-76585 | 6/1977 | Japan . |
| 60-11706 | 1/1985 | Japan . |
| 63-120901 | 5/1988 | Japan . |
| 1-501241 | 4/1989 | Japan . |
| 2-261902 | 10/1990 | Japan . |
| 3-66901 | 3/1991 | Japan . |

*Primary Examiner*—F. Daniel Lopez
*Attorney, Agent, or Firm*—Fay, Sharpe, Beall, Fagan, Minnich & McKee

[57] ABSTRACT

A hydraulic drive system of the invention comprises a plurality of flow rate sensors (10A, 10B) for detecting respective flow rates supplied to a plurality of hydraulic actuators (3A, 3B), valve controllers (11A, 11B) for respectively controlling a plurality of flow control valves (40A, 40B) such that the flow rates detected by the plurality of flow rate sensors are coincident with the flow rates instructed by a plurality of control levers (5A, 5B), and a pump tilting controller (12; 12A–12F) for controlling a delivery rate of a hydraulic pump (1) such that the delivery rate of the hydraulic pump is smaller by a predetermined flow rate ($\Delta Q_{ref}$; $X_{ref}$) than the total of the flow rates instructed by the plurality of control levers. The pump tilting controller controls the delivery rate of the hydraulic pump (1) by using flow rate deviations ($\Delta Q_1$, $\Delta Q_2$) resulted from respectively subtracting the flow rates detected by the flow rate sensors (10A, 10B) from the flow rates instructed by the control levers (5A, 5B).

5 Claims, 10 Drawing Sheets

HYDRAULIC DRIVE SYSTEM

TECHNICAL FIELD

The present invention relates to a hydraulic drive system for driving a plurality of hydraulic actuators by a single variable displacement hydraulic pump, and more particularly to a hydraulic drive system for driving a plurality of hydraulic actuators while controlling a delivery rate of a hydraulic pump depending on a demanded flow rate.

BACKGROUND ART

As to a hydraulic drive system for driving a plurality of hydraulic actuators by a single variable displacement hydraulic pump, there is known a so-called load sensing control system in which a delivery rate of the hydraulic pump is controlled in such a manner as to supply only the flow rate demanded by the hydraulic actuators. The load sensing control system is described in, for example, West German Patent No. 3,321,483, JP, A, 60-11706 which are equivalent to U.S. Pat. No. 4,617,854) and JP, A, 2-261902.

The load sensing control system (hereinafter referred to as an LS control system) comprises a variable displacement hydraulic pump, a plurality of hydraulic actuators connected to the hydraulic pump in parallel, a plurality of flow control valves for respectively driving the plurality of hydraulic actuators, a plurality of control levers for instructing respective flow rates to the plurality of flow control valves, a circuit for detecting a maximum one of the load pressures of the plurality of hydraulic actuators, and a pump regulator for controlling a delivery rate of the hydraulic pump so that a delivery pressure of the hydraulic pump is held higher by a fixed value than the maximum load pressure.

When any one of the control levers is operated, the associated flow control valve is opened with an opening corresponding to an input amount from the control lever (i.e., a demanded flow rate), whereby a hydraulic fluid from the hydraulic pump is supplied to the associated hydraulic actuator through a pressure compensating valve and the flow control valve. Simultaneously, a load pressure of that hydraulic actuator is introduced as the maximum load pressure to the pump regulator which controls the pump delivery rate so that the pump delivery pressure is held higher by a fixed value than the maximum load pressure. At this time, when the input amount from the control lever (i.e., the demanded flow rate) is small, the opening of the flow control valve is also small and so is a flow rate of the hydraulic fluid passing through the flow control valve, so that the pump delivery pressure is held higher by a fixed value than the maximum load pressure at the small pump delivery rate. When the input amount from the control lever (i.e., the demanded flow rate) is increased, the opening of the flow control valve is also increased and so does the flow rate of the hydraulic fluid passing through the flow control valve, whereupon the pump delivery rate is increased to keep the pump delivery pressure higher a fixed value than the maximum load pressure.

Meanwhile, in the system making control of the pump delivery rate in that way, when plural hydraulic actuators are simultaneously driven by operating plural control levers, the flow control valve associated with the hydraulic actuator on the lower load side produces a larger differential pressure across the same than that on the higher load side, and the hydraulic fluid is supplied at a larger flow rate to the hydraulic actuator on the lower load side. The combined operation of those plural hydraulic actuators can no longer be performed in accordance with an opening ratio between the flow control valves (i.e., a demanded flow rate ratio). To prevent such a disadvantage, the LS control system includes a pressure compensating valve disposed upstream of the flow control valve for controlling a differential pressure across the flow control valve. When the differential pressure across the flow control valve associated with the hydraulic actuator on the lower load side becomes large during the combined operation, the upstream pressure compensating valve is operated in a valve-closing direction to restrict the flow rate, thereby reducing the differential pressure across that flow control valve. As a result, the differential pressures across the flow control valves on both the higher and lower load sides are maintained at substantially the same value, enabling the associated plural actuators to be simultaneously driven in accordance with the opening ratio between the flow control valves (i.e., the demanded flow rate ratio).

With the LS control system, as mentioned above, since the delivery rate of the hydraulic pump is controlled depending on the demanded flow rate, a part of the pump delivery rate which is wastefully consumed can be reduced to make economical operation possible. In order to surely perform the combined operation, the pressure compensating valve is required for controlling the differential pressure across the associated flow control valve.

Relating to the LS control system, particularly, there is also known U.S. Pat. No. 4,712,376 which discloses a system wherein the total of input amounts from all the control levers (i.e., demanded flow rates) is calculated for the purpose of controlling respective openings of the flow control valves. This disclosed system is intended to cope with a lack of the pump delivery rate during combined operation of driving plural actuators, by restricting the respective openings of the flow control valves depending on the amount of such a deficiency, so that the combined operation is performed in accordance with a demanded flow rate ratio. In addition, though not directly related to the LS control, JP, A, 52-76585 discloses a system in which a flow rate of the hydraulic fluid supplied to a hydraulic actuator is detected for controlling an opening of an associated flow control valve so that the flow rate is held in match with a demanded flow rate.

DISCLOSURE OF THE INVENTION

However, the above-mentioned LS control system has had the following problems.

In a hydraulic drive system of the type adopting LS control, as explained above, there produces a differential pressure across the flow control valve. Given the differential pressure across the flow control valve being $\Delta P_1$, the differential pressure $\Delta P_1$ is determined by a rated flow rate and size of the flow control valve. If the flow control valve used has a large size relative to its rated flow rate, the differential pressure $\Delta P_1$ can be set to a small value. On the contrary, if the flow control valve used has a small size relative to its rated flow rate, the differential pressure $\Delta P_1$ must be set to a large value. Also, the differential pressure $\Delta P_1$ must be set to a value which is produced when the hydraulic fluid flows at the rated flow rate with the input amount from the control lever maximized to make the opening of the flow control valve maximum. Therefore, in the case of using a flow control valve having a size that is small relative to its rated flow rate for reducing the system size, the differential pressure $\Delta P_1$ necessarily becomes a large value.

Additionally, the differential pressure $\Delta P_1$ is not determined by the above conditions only. More specifically, the viscosity of the working oil (hydraulic fluid) is changed to a large extent depending on temperatures and becomes large at a low temperature. To enable the hydraulic fluid to flow at a rated flow rate even under a low temperature, therefore, it is required that the differential pressure $\Delta P_1$ be set to a higher value with a margin. Accordingly, the value of the differential pressure $\Delta P_1$ must be larger than the value determined by the foregoing conditions. In particular, when the hydraulic drive system is used with a hydraulic machine such as a hydraulic excavator, there is a substantial possibility that the construction machine is used in an outdoor environment at an extremely low temperature, which requires the margin to be relatively large and hence renders the differential pressure $\Delta P_1$ to be increased.

Thus, the differential pressure $\Delta P_1$ across the flow control valve is usually set to a large value and a pressure loss in the hydraulic circuit also becomes large correspondingly.

Furthermore, the LS control system generally includes the pressure compensating valve as mentioned above. The pressure compensating valve also produces a pressure loss $\Delta P_2$ besides the differential pressure $\Delta P_1$ across the flow control valve. The pressure loss$\Delta P_2$ comprises a pressure loss produced by the pressure compensating valve itself (i.e., a pressure loss produced when the pressure compensating valve is maximally opened), and a pressure loss produced due to that the pressure compensating valve associated with the actuator on the lower load side is restricted.

In the LS control system, therefore, the pump delivery rate must be controlled in consideration of the differential pressure $\Delta P_1$ and the pressure loss $\Delta P_2$ so that the pump delivery pressure is held higher a fixed value than the maximum load pressure. Stated otherwise, assuming that the fixed value in the LS control is a target differential pressure $\Delta P_0$, this target differential pressure $\Delta P_0$ must be set to a value larger than the sum of the differential pressure $\Delta P_1$ and the pressure loss $\Delta P_2$ and, in practice, it is set to a still larger value in consideration of a pressure through lines and so on. The target differential pressure $\Delta P_0$ is usually in a range of 15 to 30 bar and this value cannot be said to be small relative to a usual rated value of the hydraulic circuit in a range of 250 to 350 bar.

Another problem experienced in the LS control system is as follows. As explained above, the flow rate of the hydraulic fluid supplied to the hydraulic actuator is adjusted on condition that the differential pressure across the flow control valve is held constant by the pressure compensating valve. In practice, however, a flow of the hydraulic fluid (working oil) passing through the flow control valve is always affected by viscosity of the working oil. Particularly, when the working oil has high viscosity at a low temperature, the flow rate of the hydraulic fluid supplied to the hydraulic actuator becomes smaller than that instructed by the input amount from the control lever (i.e., the demanded flow rate).

An object of the present invention is to provide a hydraulic drive system which has a function of controlling a delivery rate of a hydraulic pump in accordance with a demanded flow rate, produces a small pressure loss, and can perform high-accurate flow control regardless of the temperatures of the working oil.

To achieve the above object, according to the present invention, there is provided a hydraulic drive system comprising a variable displacement hydraulic pump, a plurality of hydraulic actuators connected to said hydraulic pump in parallel, a plurality of flow control valves for respectively driving said plurality of hydraulic actuators, and a plurality of flow rate instructing means for instructing respective flow rates to said plurality of flow control valves, wherein said system further comprises a plurality of flow rate sensor means for detecting respective flow rates supplied to said plurality of hydraulic actuators, first control means for respectively controlling said plurality of flow control valves so that the flow rates detected by said plurality of flow rate sensor means are coincident with the flow rates instructed by said plurality of flow rate instructing means, and second control means for controlling a delivery rate of said hydraulic pump such that the delivery rate of said hydraulic pump is smaller by a predetermined flow rate than the total of the flow rates instructed by said plurality of flow rate instructing means.

In the above hydraulic drive system, preferably, said second control means controls a displacement volume of said hydraulic pump such that the total of the flow rates detected by said plurality of flow rate sensor means is smaller by said predetermined flow rate than the total of the flow rates instructed by said plurality of flow rate instructing means.

Also, in the above hydraulic drive system, preferably, said second control means controls the delivery rate of said hydraulic pump by using flow rate deviations resulting from respectively subtracting the flow rates detected by said plurality of flow rate sensor means from the flow rates instructed by said plurality of flow rate instructing means.

Further, in the above hydraulic drive system, preferably, said second control means comprises first calculation means for calculating the total of flow rate deviations resulted from respectively subtracting the flow rates detected by said plurality of flow rate sensor means from the flow rates instructed by said plurality of flow rate instructing means, deviation output means for outputting a value corresponding to said predetermined flow rate as a reference deviation, second calculation means for calculating a difference between the total of the flow rate deviations obtained by said first calculation means and the reference deviation output from said deviation output means, and third calculation means for determining a target displacement volume of said hydraulic pump based on the difference obtained by said second calculation means. In this case, said first calculation means preferably comprises means for adding said flow rate deviations. Said first calculation means may comprise means for selecting a maximum value of said flow rate deviations.

Moreover, in the above hydraulic drive system, preferably, said second control means comprises first calculation means for calculating the total of the flow rates instructed by said plurality of flow rate instructing means, deviation output means for outputting a value corresponding to said predetermined flow rate as a reference deviation, second calculation means for calculating a difference between the total of the instructed flow rates obtained by said first calculation means and the reference deviation output from said deviation output means, and third calculation means for determining a target displacement volume of said hydraulic pump based on the difference obtained by said second calculation means.

Additionally, in the above hydraulic drive system, preferably, said second control means includes deviation output means for outputting a value corresponding to said predetermined flow rate as a reference deviation. Said deviation output means preferably stores said reference deviation as a constant beforehand. Said deviation output means may include means for determining said reference deviation depending on the total of the flow rates instructed by said plurality of flow rate instructing means. Also, said deviation output means may include means for determining one of said plurality of hydraulic actuators which is subjected to a maximum load pressure, means for selecting one of the flow rates instructed by said flow rate instructing means which corresponds to said hydraulic actuator subjected to the maximum load pressure, and means for determining said reference deviation depending on said selected instructed flow rate.

Furthermore, in the above hydraulic drive system, preferably, said second control means comprises integration means for calculating a target displacement volume of said hydraulic pump adapted to make the delivery rate of said hydraulic pump smaller by said predetermined flow rate than the total of the flow rates instructed by said plurality of flow rate instructing means, means for calculating the total of the flow rates instructed by said plurality of flow rate instructing means, means for calculating a modification value for said target displacement volume based on the total of said instructed flow rates, and means for adding said modification value to the target displacement volume calculated by said integration means and calculating a final target displacement volume.

In the present invention thus arranged, the first control means performs flow servo control such that the flow rates detected by the flow rate sensor means are coincident with the flow rates instructed by the flow rate instructing means. Through this flow servo control, the hydraulic actuators are always supplied with the hydraulic fluid (working oil) at respective flow rates corresponding to the instruction values from the flow rate instructing means in spite of changes in temperatures of the working oil, etc. The second control means controls the delivery rate of the variable displacement hydraulic pump such that the delivery rate of the hydraulic pump is smaller by the predetermined flow rate than the total of the flow rates instructed by the flow rate instructing means. By so controlling the pump delivery rate to become smaller by the predetermined flow rate, it is possible with the above flow servo control that the flow control valve associated with the hydraulic actuator producing the maximum load pressure is controlled to be maximized in its opening, and hence a pressure loss produced by that flow control valve can be reduced.

By effecting the above control of the pump delivery rate by the second control means using flow rate deviations resulted from respectively subtracting the flow rates detected by the flow rate sensor means from the flow rates instructed by the flow rate instructing means, an influence of errors in the flow rate sensor means, control equipment for the hydraulic pump and so on can be eliminated and the aforesaid predetermined flow rate can be set to a small value when the pump delivery rate is to be controlled in accordance with demanded flow rates in parallel to the above flow servo control. As a result, an amount of deficiency in the flow rate supplied to the hydraulic actuator producing the maximum load pressure can be made smaller to enable accurate flow control.

By effecting the above control of the pump delivery rate by the second control means using the calculated total of the flow rates instructed by the flow rate instructing means, the pump delivery rate can be controlled independently of the flow servo control, which enables stable control free from hunting.

BEST MODE FOR CARRYING OUT THE INVENTION

Hereinafter, the present invention will be described in conjunction with illustrated embodiments.

First Embodiment

A first embodiment of the present invention will be explained with reference to FIGS. 1 to 4.

Figure 1:
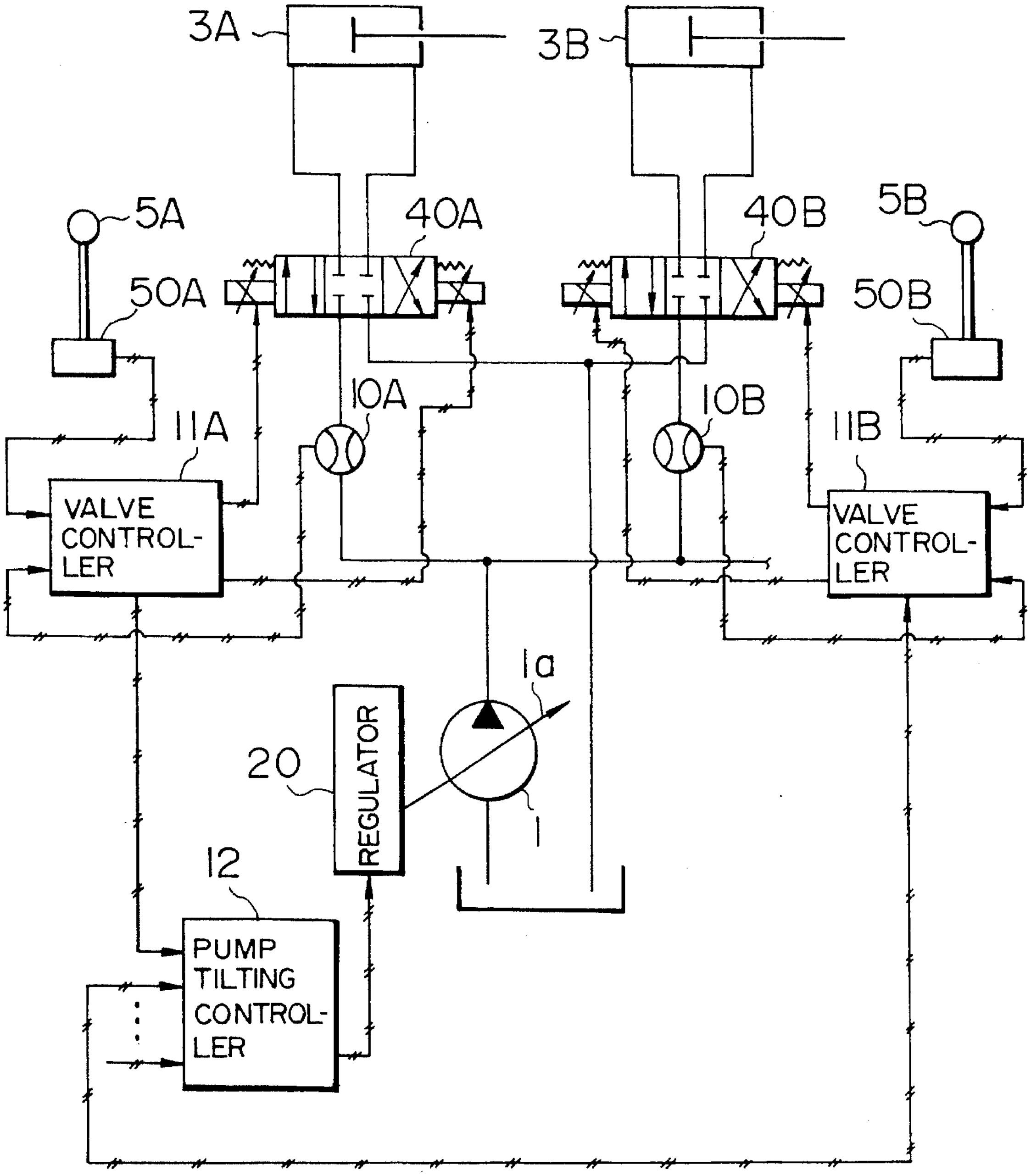
FIG. 1 is a diagram of a hydraulic drive system according to a first embodiment of the present invention.

In FIG. 1, a hydraulic drive system according to this embodiment comprises a variable displacement hydraulic pump 1 driven by a prime mover (not shown) and having a displacement volume varying mechanism (hereinafter represented by a swash plate), a plurality of hydraulic cylinders or actuators 3A, 3B . . . (hereinafter represented by 3A, 3B) connected to the hydraulic pump 1 in parallel and driven by a hydraulic fluid delivered from the hydraulic pump 1, a plurality of flow control valves 40A, 40B . . . (hereinafter represented by 40A, 40B) for respectively controlling flow rates of the hydraulic fluid supplied to the plurality of hydraulic cylinders and controlling driving of these hydraulic cylinders, a plurality of control levers 5A, 5B . . . (hereinafter represented by 5A, 5B) for instructing respective flow rates to the plurality of flow control valves, input amount sensors 50A, 50B . . . (hereinafter represented by 50A, 50B) for outputting electric signals proportional to respective input amounts from the control levers, flow rate sensors 10A, 10B . . . (hereinafter represented by 10A, 10B) for detecting respective flow rates of the hydraulic fluid supplied to the hydraulic cylinders, valve controllers 11A, 11B . . . (hereinafter represented by 11A, 11B) for respectively controlling driving of the flow control valves 40A, 40b based on signals from the input amount sensors 50A, 50B and the flow rate sensors 10A, 10B, a pump tilting controller 12 for calculating a tilting command value (target displacement volume) of the swash plate of the hydraulic pump 1 based on signals from the valve controllers 11A, 11B, and a regulator 20 for driving the swash plate 1$a$ of the hydraulic pump 1 based on a signal from the pump tilting controller 12.

The flow control valves 40A, 40B are of solenoid actuated valves electromagnetically driven with respective control signals from the valve controllers 11A, 11B. As the input amount sensors 50A, 50B, potentiometers are used by which operation of the control levers 5A, 5B in one direction from their neutral positions is given with a – sign and their operation in the other direction is given with a "+" sign. The flow rate sensors 10A, 10B can be of, for example, the turbine flow type, the volume type or the Doppler type. The regulator 20 has a solenoid valve operated in response to the signal from the pump tilting controller 12, and the swash plate la is driven through operation of that solenoid valve. The valve controllers 11A, 11B and the pump tilting controller 12 each comprise a microcomputer. Alternatively, these controllers may be constituted by one common microcomputer.

Figure 2:
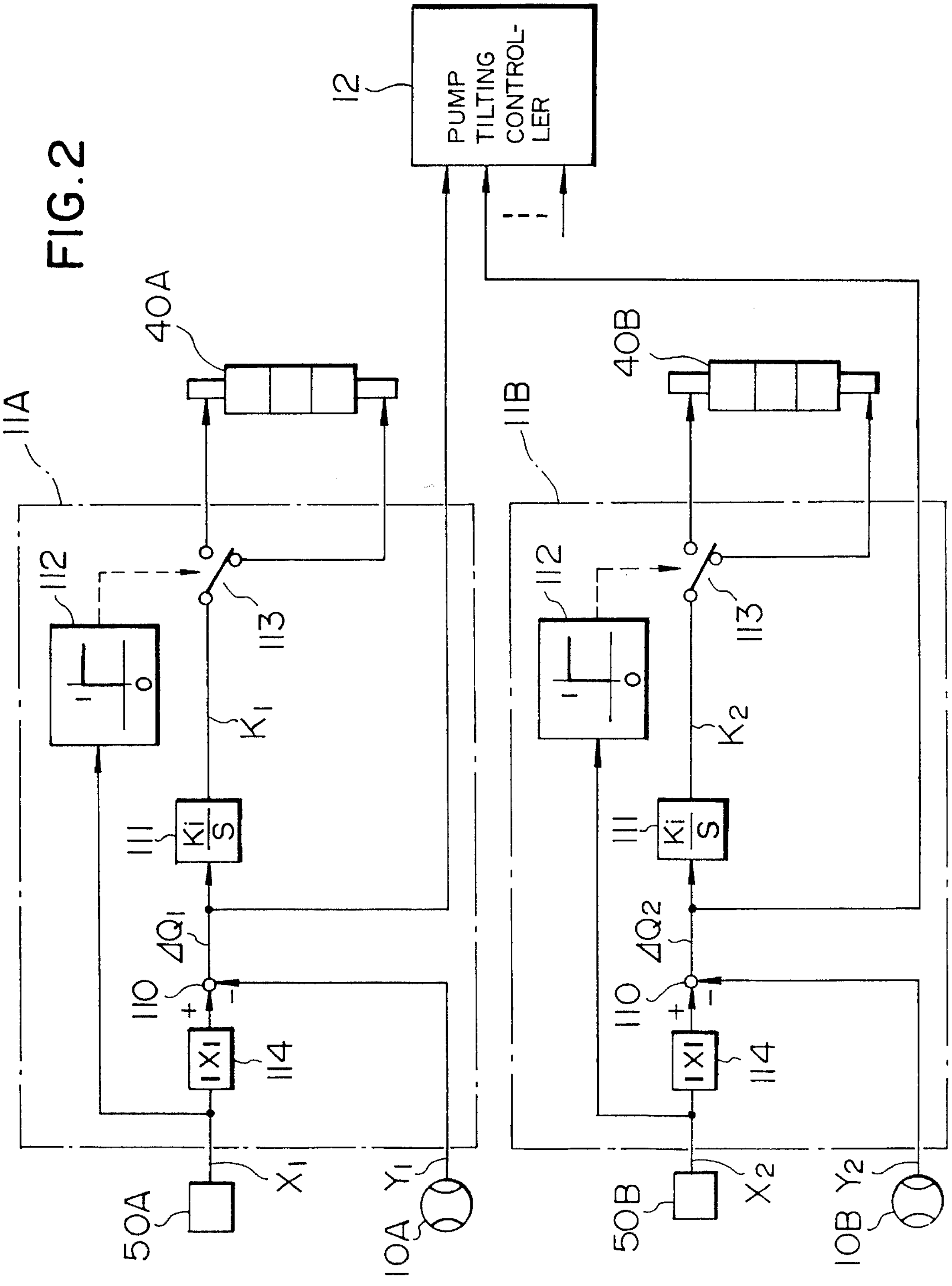
FIG. 2 is a block diagram showing a function of a valve controller shown in FIG. 1.
Figure 3:
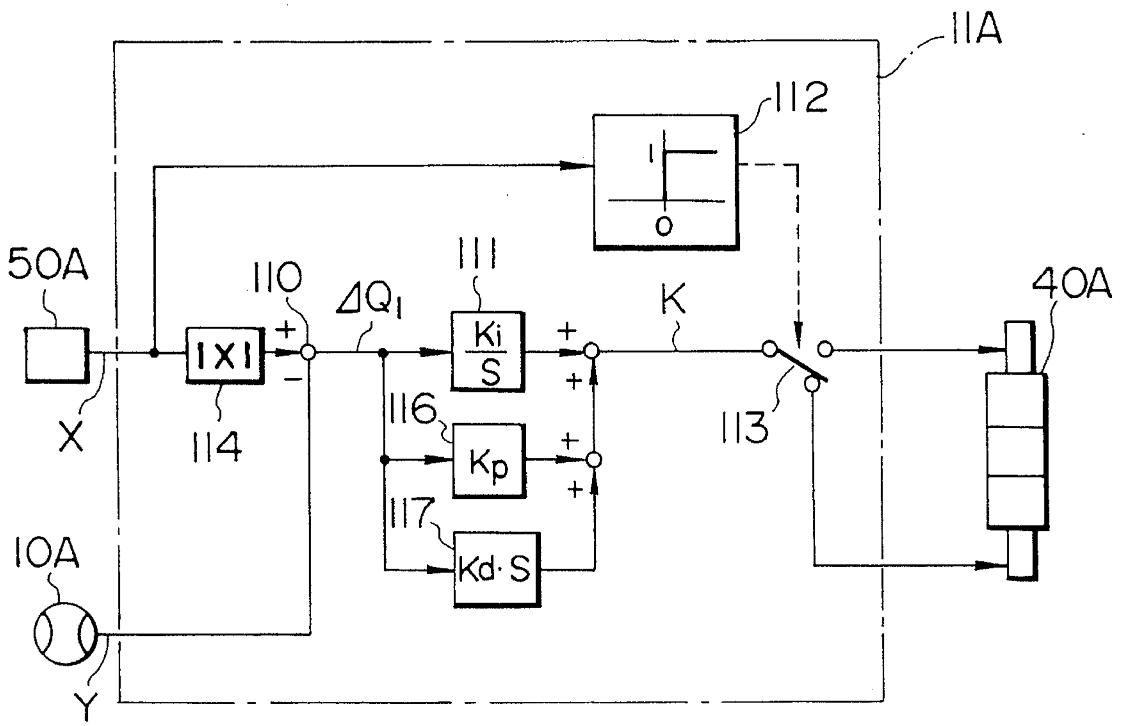
FIG. 3 is a block diagram showing a function of a modification of the valve controller shown in FIG. 1.
Figure 4:
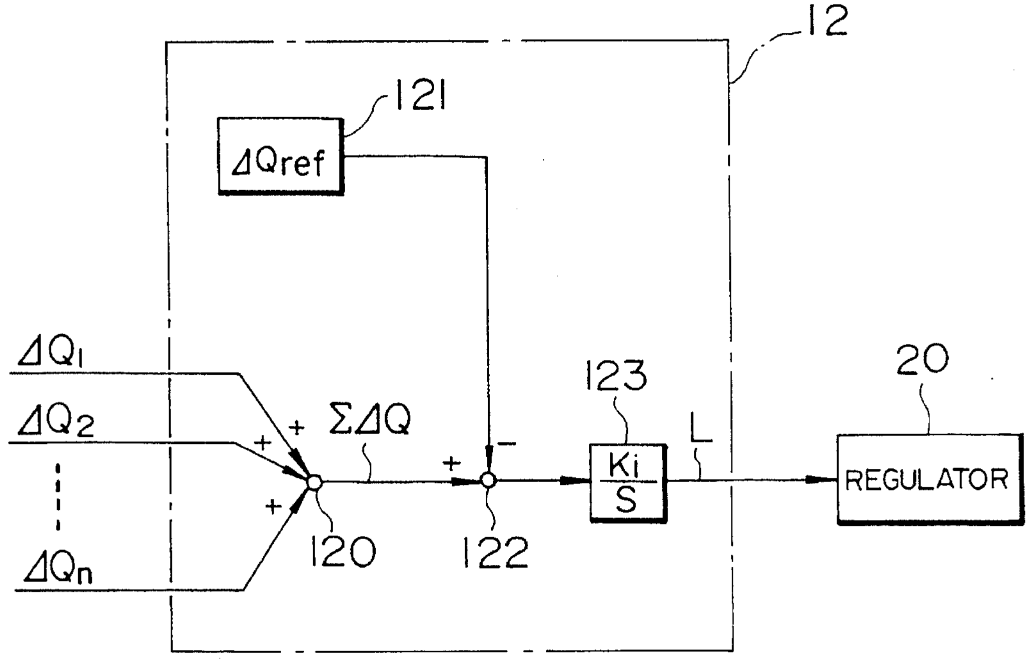
FIG. 4 is a block diagram showing a function of a pump tilting controller shown in FIG. 1.

The valve controllers 11A, 11B and the pump tilting controller 12 have control functions shown in block diagrams of FIGS. 2 to 4. These control functions will be apparent from the following description of operation of this embodiment.

Now, when the control lever 5A, for example, is operated, its input amount is detected by the input amount sensor 50A and applied to the valve controller 11A. As shown in FIG. 2, the valve controller 11A calculates a deviation $\Delta Q_1$ between a detected input amount $X_1$ and a flow rate $Y_1$ detected by the flow rate sensor 10A in a subtracter 110, integrates the deviation $\Delta Q_1$ in an integrator 111, and further calculates an opening command value $K_1$ by multiplying by a gain $K_i$. In this embodiment, taking into account that the flow rate sensor 10A always produces a positive output, an absolute value circuit 114 takes an absolute value of the input amount $X_1$, the absolute value being compared with the detected flow rate $Y_1$. A switching control unit 112 outputs a digital value "1" when the sign of the input amount $X_1$ (i.e., the direction in which the control lever 5A is operated) is "+", and a digital value "0" when it is "–". Thus, the opening command value $K_1$ is output to one side of the flow control valve 40A in correspondence with the operating direction of the control lever 5A through a switch 113 under control of the switching control unit 112. When the input amount (instructed flow rate) $X_1$ becomes equal to the detected flow rate (actual flow rate) $Y_1$, the opening command value $K_1$ comes into a steady state.

Through the foregoing feedback control, the opening degree of the flow control valve 40A is controlled depending on the input amount from the control lover in such a manner that, even with change in viscosity of the working oil and other factors, the flow control valve 40A is precisely controlled to such an opening as adapted to provide the instructed flow rate. Hereinafter, that control of the flow control valve will be referred to as flow servo control.

Also, when the control lever 5B is operated, the flow servo control is performed by the valve controller 11B in exactly the same manner as mentioned above. When the control lever 5A and the control lever 5B are both operated the valve controllers 11A, 11B implement the same flow servo control independently of each other. Note that status amounts and calculated values relating to the valve controller 11B are indicated by adding a suffix 2.

FIG. 3 shows a modification in which another function is added to the functions shown in FIG. 2. In FIG. 3, the same components as those in FIG. 2 are denoted by the same reference numerals. Denoted by 116 is a proportional element Kp for the deviation $\Delta Q$ used to improve responsivity of the control, and 117 is a differentiation element Kd·S for the deviation $\Delta Q$ used to provide stability in the control. The remaining functions are the same as shown in FIG. 2.

In parallel to the foregoing flow servo control by the valve controller 11A, the pump tilting controller 12 makes control as shown in FIG. 4. More specifically, in FIG. 4, the pump tilting controller 12 receives the deviations (hereinafter referred to as flow rate deviations) $\Delta Q_1$, $\Delta Q_2$ calculated by the subtracters 110 of the valve controllers 11A, 11B shown in FIG. 2. Note that the pump tilting controller 12 receives the flow rate deviations $\Delta Q_1$ to $\Delta Q_n$ in FIG. 4 on an assumption that the hydraulic actuators, the flow control valves, the valve controllers, etc. are each provided in number of n. The pump tilting controller 12 calculates the total $\Delta\Sigma Q$ of those flow rate deviations $\Delta Q_1$ to $\Delta Q_n$ in an adder 120. An output $\Sigma\Delta Q$ of the adder 120 is compared in a subtracter 122 with a reference deviation $\Delta Q_{ref}$ which is set as a constant in a deviation setting unit 121 beforehand, thereby calculating a value equal to a result of subtracting the latter from the former. The value obtained by the subtracter 122 is further subjected to calculation in an integrator 123 which has the same function as the integrator 111 shown in FIG. 2, and the calculated result is output as a tilting command value L to the regulator 20. In accordance with the tilting command value L, the regulator 20 controls tilting of the swash plate 1a of the hydraulic pump 1 for controlling the delivery rate of the hydraulic pump 1.

Operation of the pump tilting controller 12 will now be considered. As explained above, the valve controllers 11A, 11B implement the flow servo control for the flow control valves 40A, 40B so that the deviations $\Delta Q_1$, $\Delta Q_2$ between the instructed flow rates (demanded flow rates) corresponding to the input amounts $X_1$, $X_2$ and the detected flow rates (actual flow rates) $Y_1$, $Y_2$ each become zero. In contrast, the pump tilting controller 12 controls the delivery rate of the hydraulic pump 1 based on the integrated value of the value resulted by subtracting the reference deviation $\Delta Q_{ref}$ from the total $\Delta\Sigma Q$ of the flow rate deviations. This implies that the pump delivery rate is controlled so that the total of the detected flow rates $Y_1$, $Y_2$ becomes smaller than the total of the demanded flow rates by a predetermined flow rate corresponding to the reference deviation $\Delta Q_{ref}$. Thus, the delivery rate of the hydraulic pump 1 is controlled to a flow rate smaller than the total demanded flow rate by a predetermined flow rate corresponding to the reference deviation $\Delta Q_{ref}$.

Accordingly, when only the control lever 5A is operated, the hydraulic cylinder 3A is supplied with the hydraulic fluid at a flow rate smaller by the reference deviation $\Delta Q_{ref}$ than that corresponding to the input amount from the control lever 5A, although the valve controller 11A performs the flow servo control for the flow control valve 40A. Therefore, the opening of the flow control valve 40A is controlled to its maximum value and the resulting smaller pressure loss by the flow control valve 40A makes it possible to suppress the delivery pressure of the hydraulic pump 1 at a lower level. A reduction in the supply flow rate by the amount of $\Delta Q_{ref}$ will not give rise to any trouble in practical use if the reference deviation $\Delta Q_{ref}$ is set to a value as small as possible while achieving the intended function.

While the above explanation is concerned with the case of driving the hydraulic actuator 3A only, it similarly applies to the case of simultaneously driving the plural hydraulic actuators. More specifically, those hydraulic actuators other than that producing the maximum load pressure are supplied with the hydraulic fluid at respective demanded flow rates through the flow servo control by the associated valve controllers, but the hydraulic actuator producing the maximum load pressure is supplied with the hydraulic fluid at a flow rate smaller than the reference deviation $\Delta Q_{ref}$ than the demanded flow rate and the associated flow control valve is maximized in its opening through the flow servo control.

From the standpoint of saving in energy, the delivery pressure of the hydraulic pump is desirably the same as the maximum one of the load pressures produced by the plural hydraulic actuators. However, since the hydraulic fluid is supplied via the flow control valve to the hydraulic actuator producing the maximum load pressure, it is inevitable that the delivery pressure of the hydraulic pump is raised by an amount of the pressure loss produced by the flow control valve. Conversely, this means that by making the above pressure loss smaller, the delivery pressure of the hydraulic pump can be ideally suppressed to a necessary lowest value. In this embodiment, because the flow control valve associated with the hydraulic actuator producing the maximum load pressure is maximized in its opening, as mentioned above, the pressure loss produced by the flow control valve is minimized, enabling the delivery pressure of the hydraulic pump to be ideally suppressed to a necessary lowest value.

Also, the fact that the delivery rate of the hydraulic pump 1 is controlled to a value smaller by the reference deviation $\Delta Q_{ref}$ than the demanded flow rate has an important meaning in this embodiment as set fourth below.

Let it be supposed that the reference deviation $\Delta Q_{ref}$ is not set in this embodiment. This corresponds to the case that the hydraulic drive system shown in FIG. 1 has the pump tilting controller not provided with the components 121, 122 in the block diagram of FIG. 4. Let it be also supposed that the delivery rate of the hydraulic pump happens to become larger than the demanded flow rate in the above arrangement. This condition may occur, for example, if the flow servo control functions, prior to a reduction in the delivery rate of the hydraulic pump, for restricting the opening of the flow control valve to achieve the target flow rate, when the input amount from the control lever is reduced. In such a case, the surplus hydraulic fluid is returned to a reservoir via a relief valve provided, though not shown in FIG. 1, near a pump delivery port for the purpose of safety. Thus, the pump delivery pressure is raised up to a set pressure of the relief valve no matter how light the actuator load may be. At this time, because of being kept under the flow servo control by the valve controllers 11A, 11B, the flow control valves are controlled such that their openings are reduced to supply the hydraulic fluids at respective predetermined flow rates even with the associated actuators having light loads. Accordingly, the total flow rate deviation $\Sigma\Delta Q$ becomes 0 and the output of the integrator 123 is not changed, meaning that the pump tilting amount remains the same and the above relief condition is maintained in such case. In other words, the hydraulic pump cannot generate the required flow rate and pressure only, making the system fail to function as a practical one.

In contrast, with this embodiment, even if the system comes into the relief condition and the total flow rate deviation $\Sigma\Delta Q$ becomes 0, the tilting amount of the hydraulic pump is gradually reduced with the presence of $\Delta Q_{ref}$, enabling the system to escape from the relief condition. As a result, the hydraulic pump can be efficiently operated while generating the required flow rate and pressure only. Thus, the presence of the reference deviation $\Delta Q_{ref}$ makes it first possible with, in parallel to the flow servo control, implement control of the pump delivery rate in accordance with the demanded flow rate.

Furthermore, this embodiment uses the total flow rate deviation $\Sigma\Delta Q$, rather the input amounts $X_1$, $X_2$ from the control levers, for controlling the pump delivery rate in accordance with the demanded flow rate, and this feature provides the following important action.

Consider first the case that the delivery rate of the hydraulic pump is controlled by receiving the input amounts $X_1$, $X_2$ from the control levers without introducing the reference deviation $\Delta Q_{ref}$. In this case, if there exist no errors in the flow rate sensors 10A, 10B, the regulator 20 and so forth, no problems occur. Stated otherwise, if so, the pump delivery rate can be controlled to be coincident with the demanded flow rate in parallel to the flow servo control. Generally, however, the sensors contain errors in terms of detection accuracy. Accordingly, it is supposed that while the total of the input amounts $X_1$, $X_2$ from the control levers is recognized as 100 l/min, for example, and the hydraulic pump actually delivers the hydraulic fluid at a flow rate of 100 l/min, the hydraulic fluid is supplied to the actuators only at an actual flow rate of 99 l/min in a steady state and the flow control valves are subjected to the flow servo control independently of each other. This case happens, for example, if one flow rate sensor detects a flow rate of 51 l/min despite the actual flow rate being 50 l/min. In such a case, the hydraulic fluid is delivered from the hydraulic pump at 100 l/min, whereas the actuators are supplied with it at only 99 l/min, resulting in the problem that there occurs a surplus flow rate of 1 l/min which is released similarly to the above-mentioned case. Accordingly, the hydraulic pump requires power greater than necessary and the efficiency of the entire system is lowered.

A first method for avoiding the above drawback is to set the pump delivery rate at a relatively small value such that the delivery rate of the hydraulic pump is still insufficient or smaller than the value obtained by subtracting all of the accumulated errors possibly occurring in the sensors, the regulator and so forth from the required pump delivery rate. This can be realized by providing a reference deviation $\Delta Q_{ref}$ as with this embodiment. Note that the first method will be described in detail later as another embodiment (see FIGS. 11 and 12). In that case, the reference deviation $\Delta Q_{ref}$ is given by approximately 1 to 5% of the maximum delivery rate of the hydraulic pump x N (where N is the number of hydraulic actuators). Assuming now that accuracy of the flow rate sensors 10A, 10B are each ±2 /min, there are three hydraulic actuators, and the delivery rate accuracy of the hydraulic pump is 3 /min, by way of example, the reference deviation must be set as follows:

$$\Delta Q_{ref} \geqq 2\ (\text{l/min}) \times 3 + 3\ (\text{l/min}) = 9\ (\text{l/min})$$

A second method for avoiding the above drawback is to use the total flow rate deviation $\Sigma\Delta Q$ as practiced in this embodiment. More specifically, using the total flow rate deviation $\Sigma\Delta Q$ is equivalent to informing the hydraulic pump of whether the flow rates are sufficient or deficient, based on the result of the flow servo control on the hydraulic actuator side and, therefore, the aforesaid relief condition will not occur due to the accuracy of the flow rate sensors 10A, 10B. Also, since the tilting amount of the hydraulic pump is only increased and decreased based on information about sufficiency or deficiency in the flow rates from the hydraulic actuator side by using the integrator 123 rather than specifying an absolute value of the tilting amount, accuracy on the pump control side will never be affected.

However, in the case of using the total flow rate deviation $\Sigma\Delta Q$, the relief condition may occur for another reason as mentioned above in the absence of the reference deviation $\Delta Q_{ref}$, making the system fail to function as a practical one. Because $\Delta Q_{ref}$ used in this case is not affected by accuracy of the sensors and the pump control side, it can be set to a very small value in consideration of, strictly speaking, an error possibly occurred in calculation by the controllers which generally comprise microcomputers. The reference deviation $\Delta Q_{ref}$ is approximately 0.1 to 3% of the maximum delivery rate of the hydraulic pump. Accordingly, it is possible to minimize a lack of the flow rate for the hydraulic actuator producing the maximum load pressure and to achieve the accurate flow control. It should be understood that when a response becomes slow in the transient region because the reference deviation $\Delta Q_{ref}$ is too small, the reference deviation $\Delta Q_{ref}$ is actually determined, taking into account responsivity as well.

With this embodiment, as explained above, since the flow servo control is performed so as to make the opening of the flow control valve match the demanded flow rate, the hydraulic actuator driven through the flow control valve can be operated with high accuracy without being affected by oil temperatures, etc. Also, since the flow control valve associated with the hydraulic actuator producing the maximum load pressure is maximized in its opening, the pressure loss can be suppressed to a small value.

Further, with this embodiment, since the delivery rate of the hydraulic pump is controlled by using the total flow rate deviation $\Sigma\Delta Q$, the pump delivery rate can be controlled by setting a small value of the reference deviation $\Delta Q_{ref}$ without causing the relief condition, and an influence of the reference deviation upon the flow control is minimized to enable the accurate flow control.

Second Embodiment

Figure 5:
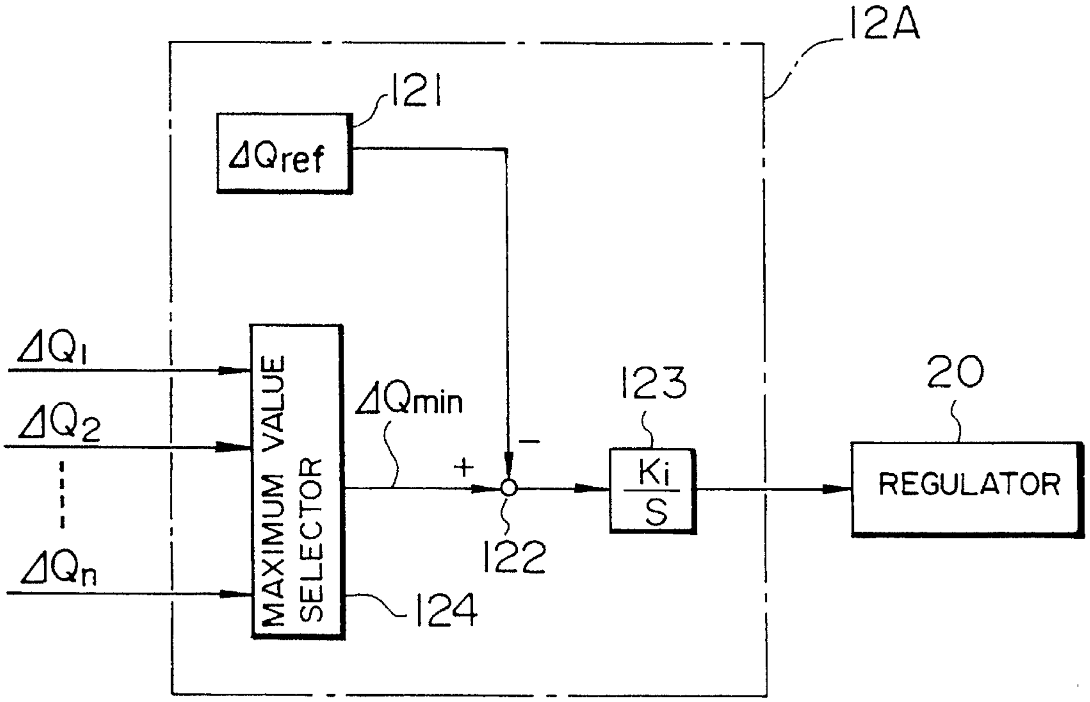
FIG. 5 is a block diagram showing a function of a pump tilting controller in a hydraulic drive system according to a second embodiment of the present invention.

A second embodiment of the present invention will be described with reference to FIG. 5. In this embodiment, a pump tilting controller 12A has functions different from those shown in FIG. 4 only in that a maximum value selector 124 is provided instead of the adder 120, the remaining functions are the same. The maximum value selector 124 selects a maximum one of the deviations $\Delta Q_1, \Delta Q_2 \ldots \Delta Q_n$ and outputs it to the subtracter 122. Selecting the maximum flow rate deviation by the maximum value selector 124 in this embodiment implies that the tilting control of the hydraulic pump is performed by using information about the actuator input flow rate that is most insufficient, whereby a transient response is improved.

Referring back to FIG. 1, when the hydraulic cylinder 3A is driven by operating only the control lever 5A, the valve controller 11A implements the flow servo control for the flow control valve 40A in such a manner as explained above. In the case of sole operation of one hydraulic actuator, because the total flow rate deviation $\Sigma\Delta Q$ and the maximum flow rate deviation have the same value, the pump tilting controller 12A implements the control with the same functions as those of the first embodiment shown in FIG. 4. Specifically, the flow rate deviation $\Delta Q_1$ as a deviation between the input amount $X_1$ and the detected flow rate $Y_1$ is selected as the maximum flow rate deviation by the maximum value selector 124, and the pump delivery rate is controlled to become smaller by the reference deviation $\Delta Q_{ref}$ than the demanded flow rate. Also, the flow control valve 40A is controlled to have its maximum opening.

Let it be supposed that, under the above condition, the control lever 5B is operated to drive the hydraulic cylinder 3B and the hydraulic cylinder 3B produces a higher load pressure than the hydraulic cylinder 3A. In this case, the delivery pressure of the hydraulic pump 1 is raised and, at the same time, the tilting amount of the swash plate 1*a* of the hydraulic pump 1 must be increased, thereby giving rise to a transient phenomenon below.

For the flow control valve 40A, since the pressure is raised in a maximum opening condition, the flow rate becomes too large and the flow rate deviation $\Delta Q_1$ takes a negative value. On the other hand, for the flow control valve 40B, since the pressure is raised in a maximum opening condition, the flow rate becomes insufficient until the tilting amount of the hydraulic pump 1 is increased, and the flow rate deviation $\Delta Q_2$ takes a positive value.

In such a condition, $(\Delta Q_2-|\Delta Q_1|)-\Delta Q_{ref}$ is applied to the integrator 123 in the first embodiment having the functions shown in FIG. 4. Meanwhile, $\Delta Q_2$ is selected by the maximum value selector 124 and $\Delta Q_2-\Delta Q_{ref}$ is applied to the integrator 123 in the this embodiment having the functions shown in FIG. 5. Thus, the value (absolute value) applied to the integrator 123 is larger in this embodiment of FIG. 5 than in the first embodiment of FIG. 4. Accordingly, the tilting command value L can be increased at a higher speed and responsivity of the tilting in the transient region can be improved.

In a steady state, the flow rate supplied to only the hydraulic cylinder 3B as the hydraulic actuator producing the maximum load pressure becomes insufficient by an amount of the reference deviation $\Delta Q_{ref}$ and the flow control valve 40B is controlled to be maximized in its opening. Also, the flow rate deviation $\Delta Q_2$ $(=+\Delta Q_{ref})$ for the hydraulic cylinder 3B is selected as the maximum flow rate deviation by the maximum value selector 124 and the input to the integrator 123 becomes 0, thereby keeping the pump tilting amount constant. At this time, because of the flow rate deviation $\Delta Q_1$ for hydraulic cylinder 3A being 0, there is obtained the same result as the case that the total flow rate deviation $\Sigma\Delta Q$ is calculated and output the integrator 123 in the first embodiment having the functions shown in FIG. 4. In other words, the maximum value selector 124 functions as means for calculating the total flow rate deviation $\Sigma\Delta Q$ in a steady state.

As a result, with this embodiment, it is possible to not only obtain the same advantage as that of the first embodiment, but also achieve the pump tilting control with a good response since the tilting control of the hydraulic pump is performed by using the maximum flow rate deviation as information about the actuator input flow rate that is most insufficient.

Third Embodiment

A third embodiment of the present invention will be described with reference to FIG. 6. In the foregoing embodiments, the reference deviation $\Delta Q_{ref}$ has been described as a preset constant. It has also been stated that the satisfactory operation can be achieved by setting the reference deviation $\Delta Q_{ref}$ to be approximately 0.1 to 3% of the maximum delivery rate of the hydraulic pump in consideration of responsivity in the transient region. However, because the hydraulic actuator operated under the maximum load pressure is always supplied with the hydraulic fluid only at a flow rate smaller the deviation $\Delta Q_{ref}$ than the demanded flow rate, the deviation $\Delta Q_{ref}$ is desirably made as small as practicable in fine operation requiring higher accuracy. This embodiment includes a function to meet such a requirement.

Figure 6:
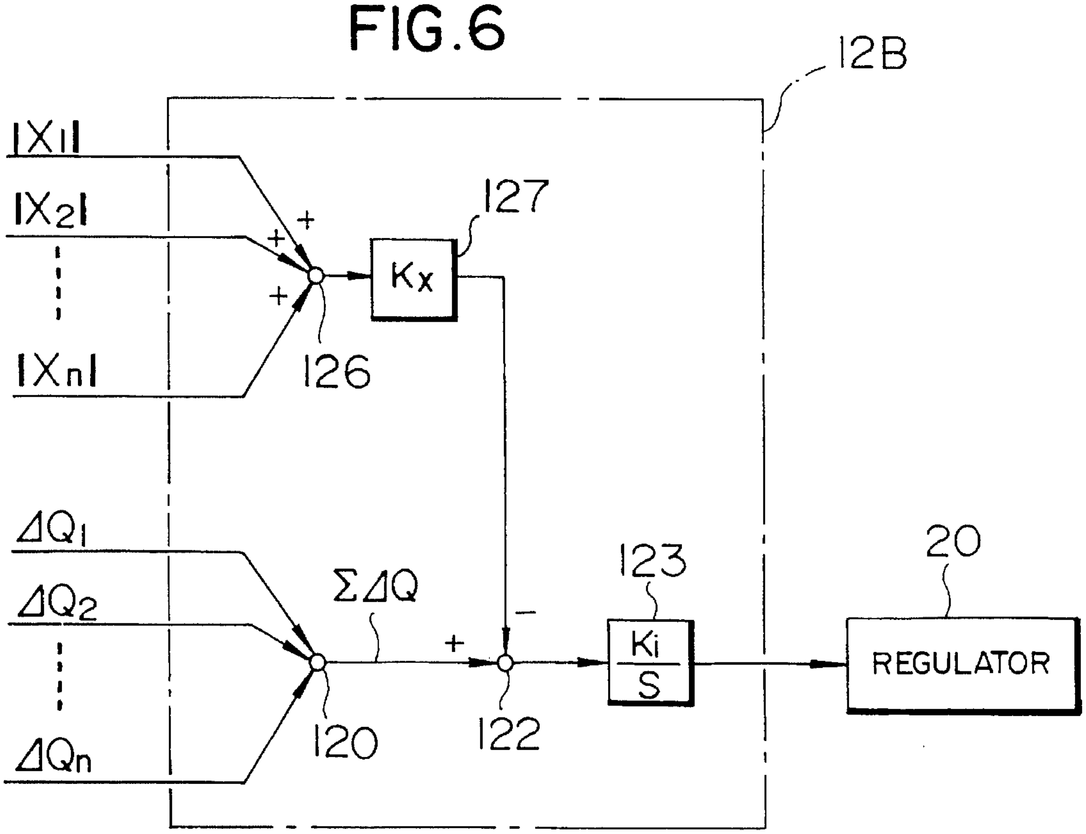
FIG. 6 is a block diagram showing a function of a pump tilting controller in a hydraulic drive system according to a third embodiment of the present invention.

In FIG. 6, a pump tilting controller 12B receives, in addition to the signals of the flow rate deviations $\Delta Q_1, \Delta Q_2 \ldots \Delta Q_n$ from the valve controllers 11A, 11B, the signals of absolute values of the input amounts $X_1, X_2 \ldots X_n$ from the control levers and calculates the tilting command value L based on these signals. Specifically, the pump tilting controller 12B has an adder 126 for adding the absolute values of the input amounts $X_1, X_2 \ldots X_n$, and a multiplier 127 for multiplying the total of these absolute values of the input amounts by a constant Kx. An output of the multiplier 127 becomes the deviation $\Delta Q_{ref}$. The remaining functions are the same as those shown in FIG. 4.

With this embodiment thus arranged, the total of the demanded flow rates is calculated by the adder 126 and the deviation $\Delta Q_{ref}$ is determined by multiplying the total demanded flow rate by the proper constant Kx. Thus, the deviation $\Delta Q_{ref}$ is determined in proportion to the total demanded flow rate, with the result that when the total demanded flow rate is small, a control error in the flow rate supplied to the hydraulic actuator producing the maximum load pressure can be made smaller. On the contrary, when the total demanded flow rate is large, the deviation $\Delta Q_{ref}$ also becomes large to permit the control with a good response in the transient region.

Fourth Embodiment

Figure 7:
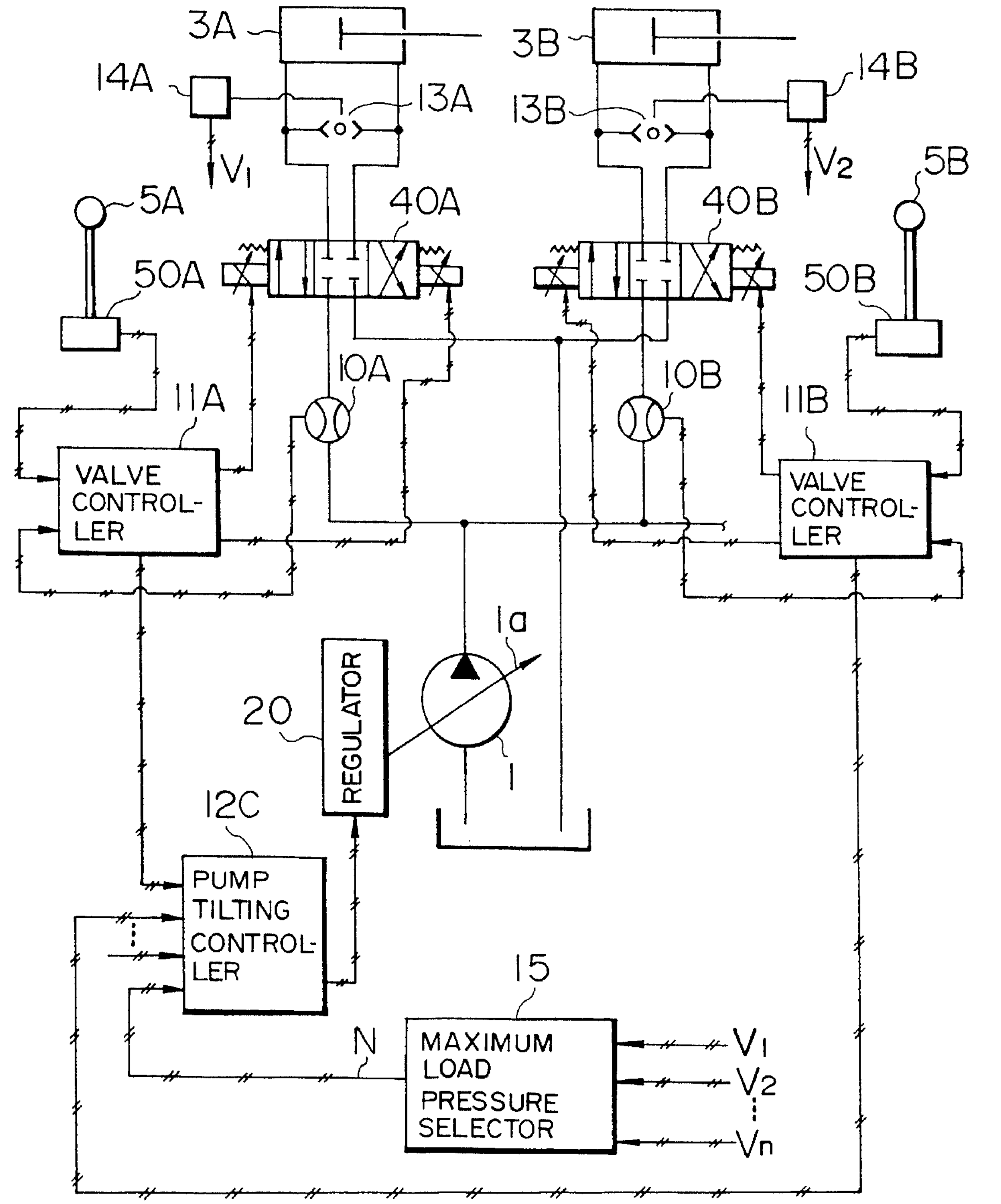
FIG. 7 is a diagram of a hydraulic drive system according to a fourth embodiment of the present invention.

A fourth embodiment of the present invention will be described with reference to FIGS. 7 and 8. This embodiment is intended to provide another method of determining the reference deviation $\Delta Q_{ref}$. In FIG. 7, the same components as those in FIG. 1 are denoted by the same reference numerals.

In FIG. 7, a hydraulic drive system of this embodiment includes shuttle valves 13A, 13B . . . (hereinafter represented by 13A, 13B), pressure sensors 14A, 14B . . . (hereinafter represented by 14A, 14B), and a maximum load pressure selector 15. The pressure sensors 14A, 14B respectively output, through the shuttle valves 13A, 13B, electric signals $V_1$, $V_2$ proportional to load pressures of the hydraulic cylinders 3A, 3B. The maximum load pressure selector 15 receives the signals from the pressure sensors 14A, 14B and outputs a signal N corresponding to the hydraulic actuator which produces a maximum load pressure. A pump tilting controller 12C has the same functions as those of the pump tilting controller 12 shown in FIG. 1 except for its part.

Figure 8:
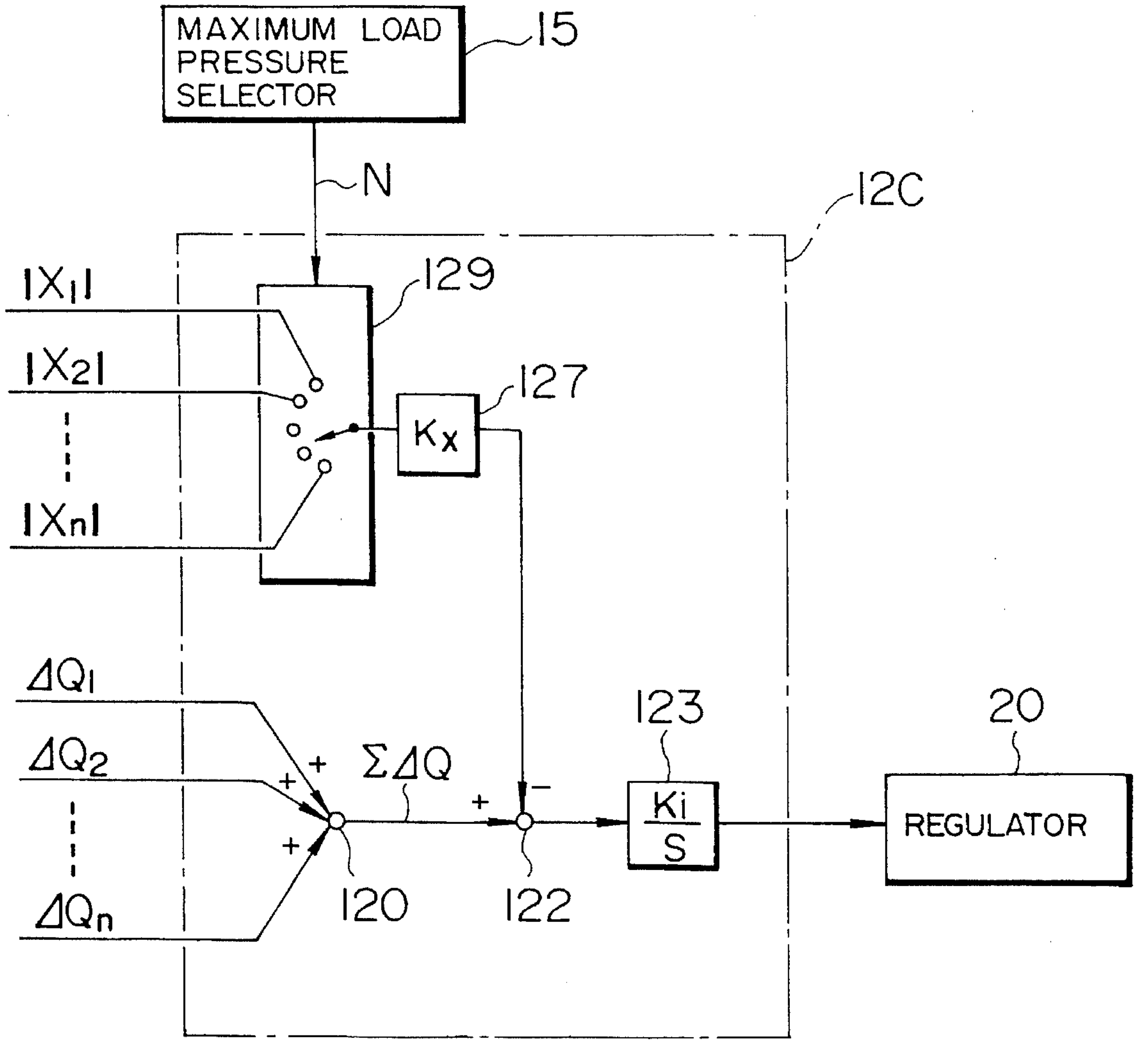
FIG. 8 is a block diagram showing a function of a pump tilting controller shown in FIG. 7.

FIG. 8 is a block diagram for explaining functions of the pump tilting controller 12C. The pump tilting controller 12C receives, in addition to the signals of the flow rate deviations $\Delta Q_1$, $\Delta Q_2$ . . . $\Delta Q_n$ from the valve controllers 11A, 11B, the signals of absolute values of the input amounts $X_1$, $X_2$ . . . $X_n$ from the control levers and the signal N from the maximum load pressure selector 15. The pump tilting controller 12C has a switching unit 129 for receiving the absolute values of the input amounts $X_1$, $X_2$ . . . $X_n$ and the signal N from the maximum load pressure selector 15 and selecting the absolute value of the input amount corresponding to the hydraulic actuator which produces the maximum load pressure, and a multiplier 127 for multiplying the selected absolute values of the input amount by a constant Kx. An output of the multiplier 127 becomes the deviation $\Delta Q_{ref}$. The remaining functions are the same as those shown in FIG. 4.

In this embodiment, as mentioned before, the hydraulic actuator producing the maximum load pressure is always supplied with the hydraulic fluid at a flow rate smaller by the reference deviation $\Delta Q_{ref}$ than the demanded flow rate. Therefore, by changing the reference deviation $\Delta Q_{ref}$ depending on the instructed flow rate for that hydraulic actuator, control accuracy can be further increased. The pressure sensors 14A, 14B and the maximum load pressure selector 15 shown in FIG. 7 are provided for the above purpose. More specifically, the maximum load pressure selector 15 functions as means for detecting the hydraulic actuator producing the maximum load pressure; i.e., it selects the hydraulic actuator producing the maximum load pressure based on the pressure signals applied thereto and outputs the signal N corresponding to that hydraulic actuator. The pump tilting controller 12C receives the signal N at the switching unit 129, selects one of the absolute values of the input amounts from the control levers corresponding to that hydraulic actuator, and outputs it to the multiplier 127. As a result, the hydraulic actuator producing the maximum load pressure is surely supplied with the hydraulic fluid at a flow rate smaller than the demanded flow rate by a value equal to the product of the demanded flow rate and the constant Kx. GiwBn the value Kx being 0.01, by way of example, the deviation $\Delta Q_{ref}$ is 1% of the instructed flow rate for the hydraulic actuator.

With this embodiment, since the reference deviation is determined depending on the demanded flow rate for the hydraulic actuator producing the maximum load pressure, a control error in the flow rate supplied to that hydraulic actuator can be made smaller when the demanded flow rate is small. On the contrary, when the demanded flow rate is large, the deviation $\Delta Q_{ref}$ also becomes large to permit the control with a good response in the transient region.

Fifth Embodiment

A fifth embodiment of the present invention will be described with reference to FIG. 9. While the above fourth embodiment uses the maximum load pressure selector as means for detecting the hydraulic actuator producing the maximum load pressure, this embodiment adopts another method in this respect.

Figure 9:
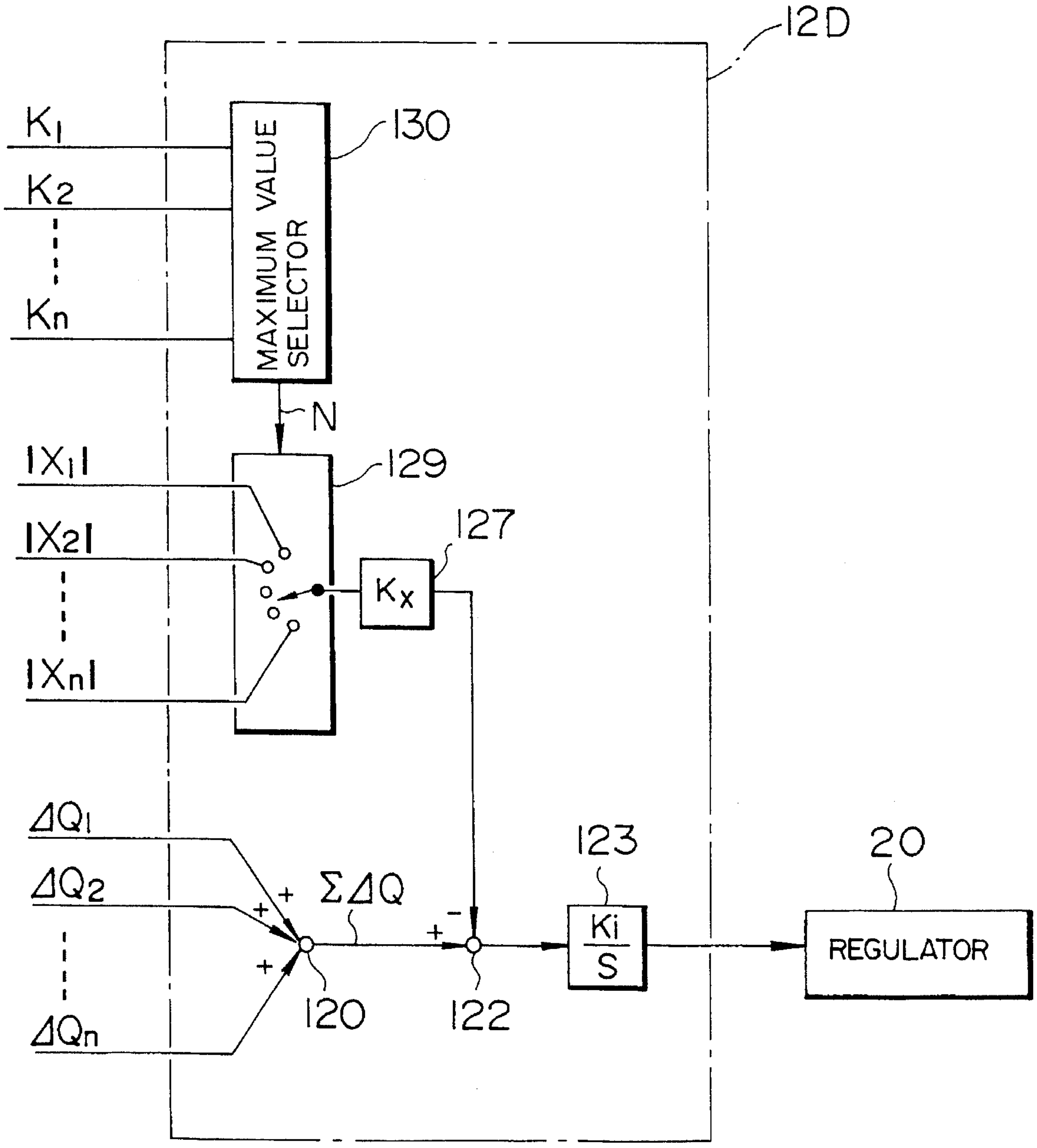
FIG. 9 is a block diagram showing a function of a pump tilting controller in a hydraulic drive system according to a fifth embodiment of the present invention.

In FIG. 9, a pump tilting controller 12D of this embodiment has a maximum value selector 13 which receives the opening command values $K_1$, $K_2$ . . . $K_n$ calculated by the respective valve controllers, selects the hydraulic actuator corresponding to the maximum opening command value as the hydraulic actuator producing the maximum load pressure, and then outputs the corresponding signal N. Since the hydraulic actuator producing the maximum load pressure is controlled with the maximum opening, the hydraulic actuator producing the maximum load pressure can be also detected in this embodiment by selecting the hydraulic actuator corresponding to the maximum opening command value. In response to the signal N from the maximum value selector 130, the switching unit 129 selects one of the absolute values of the input amounts from the control levers corresponding to that hydraulic actuator, and outputs it to the multiplier 127. The remaining functions are the same as those shown in FIG. 4.

This embodiment can also provide advantages similar to the fourth embodiment shown in FIGS. 7 and 8.

Sixth Embodiment

A sixth embodiment of the present invention will be described with reference to FIG. 10. This embodiment is intended to improve responsivity of the pump tilting control.

Figure 10:
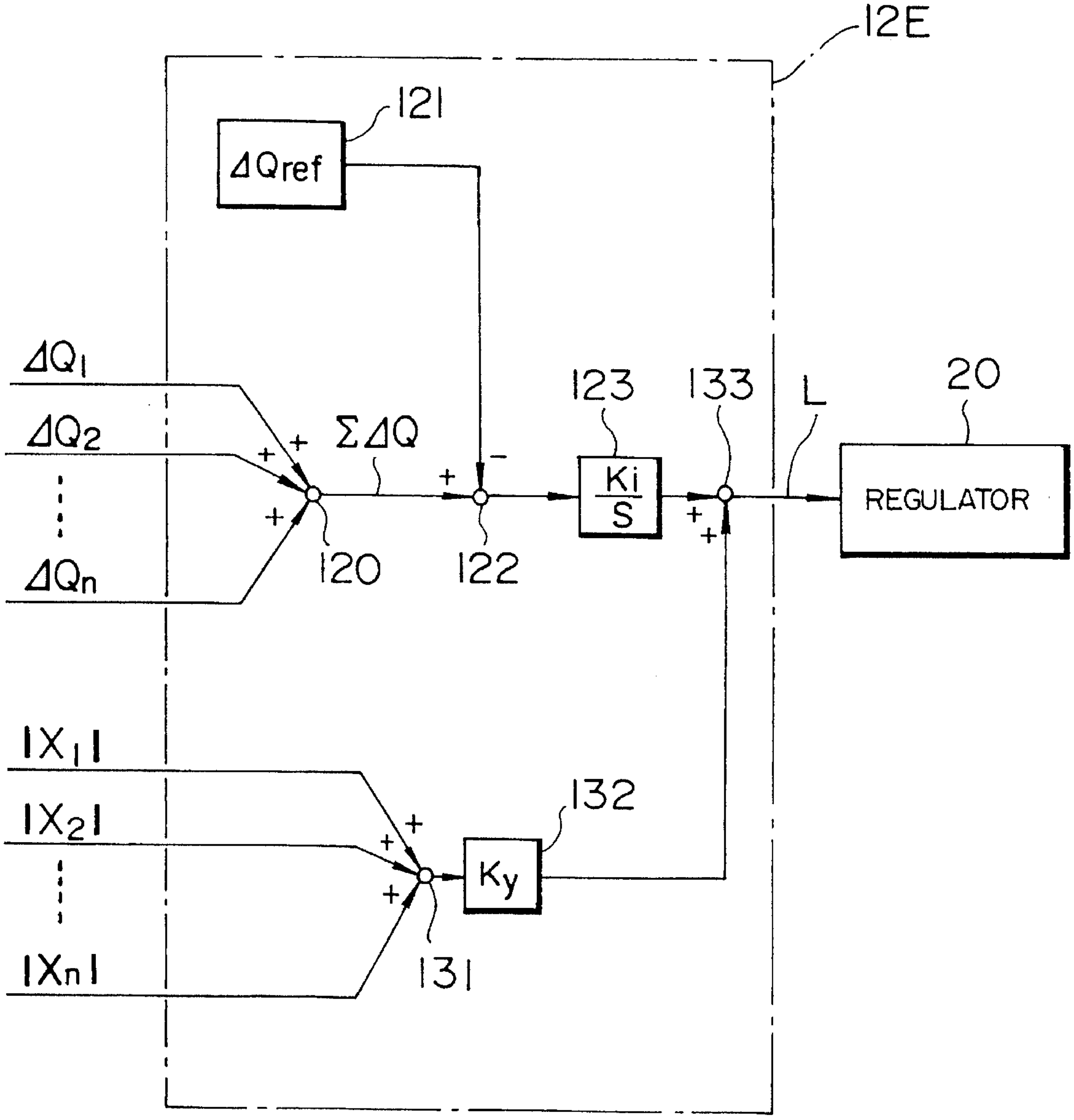
FIG. 10 is a block diagram showing a function of a pump tilting controller in a hydraulic drive system according to a sixth embodiment of the present invention.

In FIG. 10, a pump tilting controller 12E receives the signals of the flow rate deviations $\Delta Q_1$, $\Delta Q_2$ . . . $\Delta Q_n$ from the valve controllers 11A, 11B and the signals of absolute values of the input amounts $X_1$, $X_2$ . . . $X_n$ from the control levers, and calculates the tilting command value L based on these signals. Specifically, the pump tilting controller 12E has an adder 131 for adding the absolute values of the input amounts $X_1$, $X_2$ . . . $X_n$, a multiplier 132 for multiplying the total of these absolute values of the input amounts by a constant Ky, and an adder 133 for adding an output of the multiplier 132 to the output of the integrator 123. An output of the multiplier 132 is used as a modification value for the tilting command value and an output of the adder 133 becomes the final tilting command value L. The remaining functions are the same as those shown in FIG. 4.

With this embodiment thus arranged, since the modification value proportional to the total of the absolute values of the input amounts $X_1$, $X_2$ . . . $X_n$ is added in the adder 133 to the tilting command value obtained as an integrated value, there can be provided an advantage of improving responsivity in the transient region. Note that for the same reason as stated in connection with the second embodiment of FIG. 5, a maximum value selector may be used instead of the adder 131.

Seventh Embodiment

A seventh embodiment of the present invention will be described with reference to FIGS. 11 and 12. In this embodiment, the delivery rate of the hydraulic pump is controlled in accordance with the demanded flow rate by using the total of the input amounts from the control levers rather than the total $\Sigma\Delta Q$ of the flow rate deviations.

Figure 11:
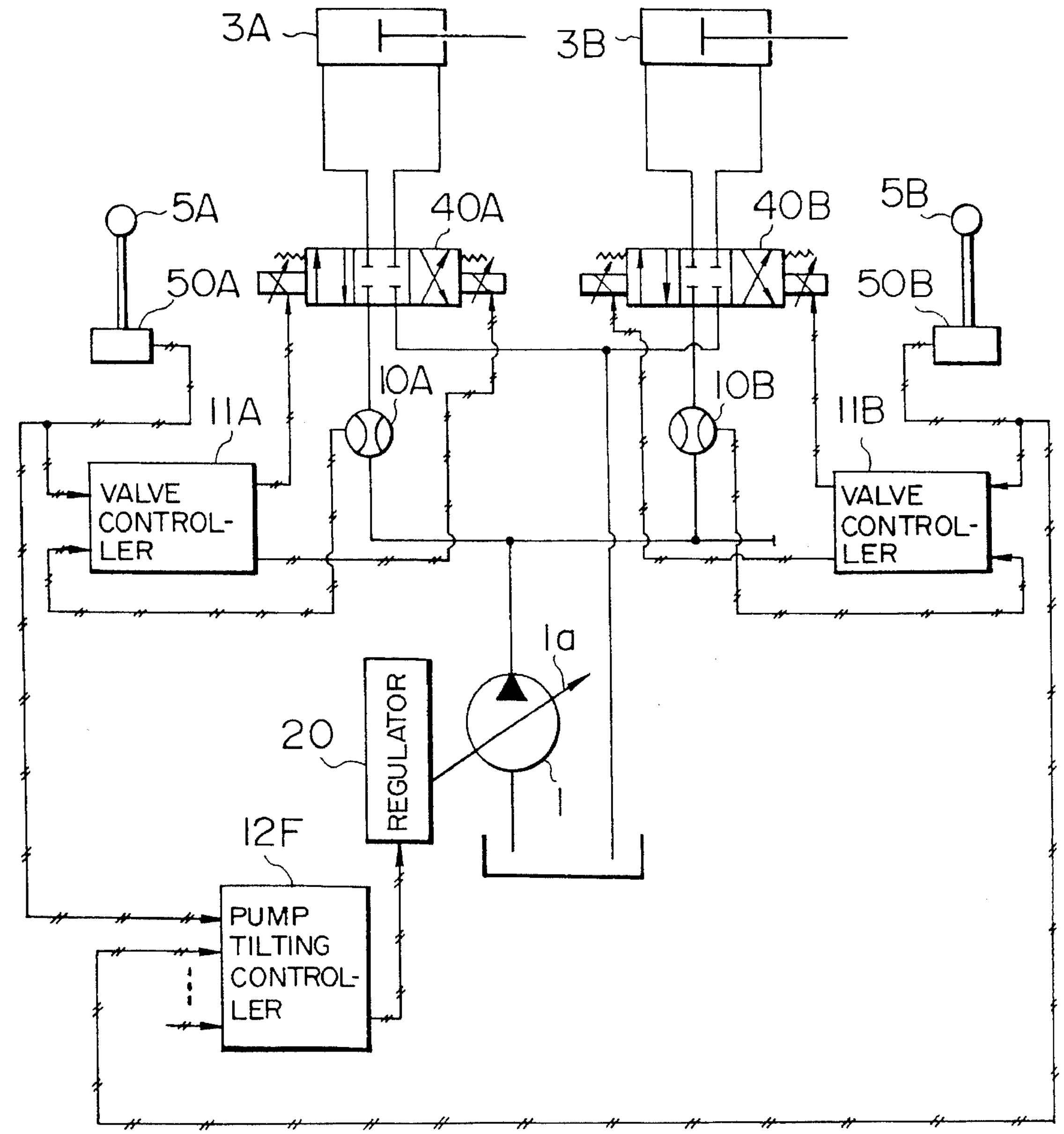
FIG. 11 is a diagram of a hydraulic drive system according to a seventh embodiment of the present invention.

In FIG. 11, a hydraulic drive system of this embodiment includes a pump tilting controller 12F for receiving the signals of the input amounts $X_1$, $X_2$ from the control levers 5A, 5B detected by the input amount sensors 50A, 50B, and calculating the tilting command value.

Figure 12:
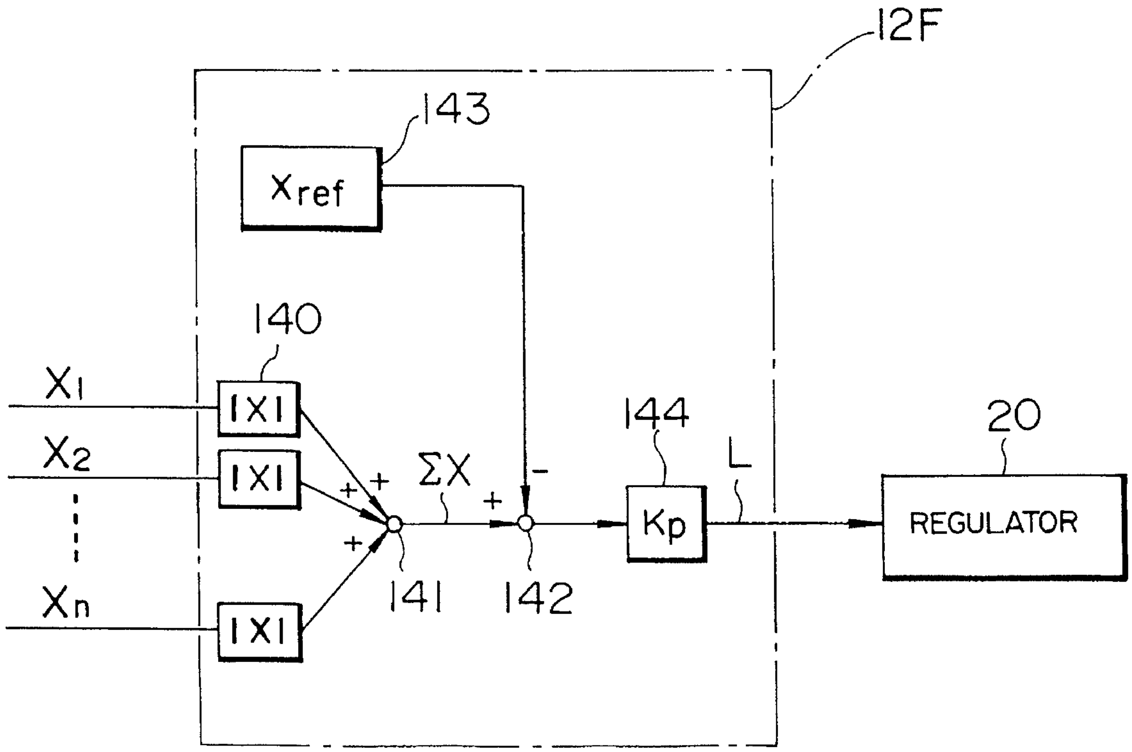
FIG. 12 is a block diagram showing a function of a pump tilting controller shown in FIG. 11.

In the pump tilting controller 12F, as shown in FIG. 12, absolute values of the input amounts $X_1$, $X_2$ from the control levers 5A, 5B in an absolute value circuit 140 and these absolute values are added in an adder 141 to determine the total $\Sigma X$ of the input amounts. An output $\Sigma X$ of the adder 141 is compared in a subtracter 142 with a reference deviation $X_{ref}$ set as a constant in a deviation setting unit 143 beforehand, thereby calculating a value equal to a result of subtracting the latter from the former. The value obtained by the subtracter 142 is further subjected to calculation in a proportion unit 144 and the calculated result is output as a tilting command value L to the regulator 20. In accordance with the tilting command value L, the regulator 20 controls tilting of the swash plate 1*a* of the hydraulic pump 1 for controlling the delivery rate of the hydraulic pump 1.

As stated before, when the delivery rate of the hydraulic pump is controlled by using the total $\Sigma X$ of the input amounts from the control levers without introducing the reference deviation $X_{ref}$, the delivery rate of the hydraulic pump may become larger than the flow rate actually passing through the flow control valve due to errors in the flow rate sensors 10A, 10B, the regulator 20 and so forth, which results in the problem that the surplus flow rate may be released. Setting of the reference deviation $X_{ref}$ makes it possible to eliminate that problem and achieve economical operation. In this embodiment, the reference deviation $X_{ref}$ is given by approximately 1 to 5% of the maximum delivery rate of the hydraulic pump ×N (where N is the number of hydraulic actuators).

Further, as with the case of using the total flow rate deviation $\Sigma\Delta Q$, since the pump delivery rate is kept smaller than the demanded flow rate, the flow control valve associated with the hydraulic actuator producing the maximum load pressure is controlled to be maximized in its opening, whereby the pressure loss can be suppressed to a small value.

Additionally, with this embodiment, since the pump tilting is controlled through an open loop independently of the flow servo control for the valve controllers 11A, 11B, it is possible to ensure stable delivery rate control of the hydraulic pump without causing hunting.

INDUSTRIAL APPLICABILITY

According to the present invention, as described above, since the flow servo control is performed so as to make the opening of the flow control valve match with the demanded flow rate, the hydraulic actuator driven through the flow control valve can be operated with high accuracy without being affected by oil temperatures, etc. Also, since the flow control valve associated with the hydraulic actuator producing the maximum load pressure is maximized in its opening, the pressure loss can be suppressed to a small value. Further, in the case that the delivery rate of the hydraulic pump is controlled by using the total flow rate deviation $\Sigma\Delta Q$, the pump delivery rate can be controlled by setting a small value of the reference deviation $\Delta Q_{ref}$ without causing the relief condition. In addition, accurate flow control can be enabled. Alternatively, in the case that the delivery rate of the hydraulic pump is controlled by using the total input amount $\Sigma X$, the pump delivery rate can be controlled not only in a reliable manner without causing the relief condition, but also in a stable manner without causing hunting.

We claim:

1. A hydraulic drive system comprising a variable displacement hydraulic pump, a plurality of hydraulic actuators connected to said hydraulic pump in parallel, a plurality of flow control valves for respectively driving said plurality of hydraulic actuators, and a plurality of flow rate instructing means for instructing respective flow rates to said plurality of flow control valves, said system further comprising:

a plurality of flow rate sensor means for detecting respective flow rates supplied to said plurality of hydraulic actuators;

first control means for respectively controlling said plurality of flow control valves so that the flow rates detected by said plurality of flow rate sensor means are coincident with the flow rates instructed by said plurality of flow rate instructing means; and second control means for controlling a delivery rate of said hydraulic pump by using flow rate deviations resulting from respectively subtracting the flow rates detected by said plurality of flow rate sensor means from the flow rates instructed by said plurality of flow rate instructing means such that the delivery rate of said hydraulic pump is smaller by a predetermined flow rate than a total amount of the flow rates instructed by said plurality of flow rate instructing means, wherein said second control means comprises first calculation means for selecting a maximum value of said flow rate deviations,deviation output means for outputting a value corresponding to said predetermined flow rate as a reference deviation, second calculation means for calculating a difference between the maximum value of the flow rate deviations obtained by said first calculation means and the reference deviation output from said deviation output means, and third calculation means for determining a target displacement volume of said hydraulic pump based on the difference obtained by said second calculation means.

2. A hydraulic drive system comprising a variable displacement hydraulic pump, a plurality of hydraulic actuators connected to said hydraulic pump in parallel, a plurality of flow control valves for respectively driving said plurality of hydraulic actuators, and a plurality of flow rate instructing means for instructing respective flow rates to said plurality of flow control valves, said system further comprising:

a plurality of flow rate sensor means for detecting respective flow rates supplied to said plurality of hydraulic actuators;

first control means for respectively controlling said plurality of flow control valves so that the flow rates detected by said plurality of flow rate sensor means are coincident with the flow rates instructed by said plurality of flow rate instructing means; and second control means for controlling a delivery rate of said hydraulic pump by using flow rate deviations resulting from respectively subtracting the flow rates detected by said plurality of flow rate sensor means from the flow rates instructed by said plurality of flow rate instructing means such that the delivery rate of said hydraulic pump is smaller by a predetermined flow rate than a total amount of the flow rates instructed by said plurality of flow rate instructing means, wherein said second control means includes deviation output means for outputting a value corresponding to said predetermined flow rate as a reference deviation; and wherein said deviation output means includes means for determining said reference deviation depending on the total of the flow rates instructed by said plurality of flow rate instructing means.

3. A hydraulic drive system comprising a variable displacement hydraulic pump, a plurality of hydraulic actuators connected to said hydraulic pump in parallel, a plurality of flow control valves for respectively driving said plurality of hydraulic actuators, and a plurality of flow rate instructing means for instructing respective flow rates to said plurality of flow control valves, said system further comprising;

a plurality of flow rate sensor means for detecting respective flow rates supplied to said plurality of hydraulic actuators;

first control means for respectively controlling said plurality of flow control valves so that the flow rates detected by said plurality of flow rate sensor means are coincident with the flow rates instructed by said plurality of flow rate instructing means; and second control means for controlling a delivery rate of said hydraulic pump by using flow rate deviations resulting from respectively subtracting the flow rates detected by said plurality of flow rate sensor means from the flow rates instructed by said plurality of flow rate instructing means such that the delivery rate of said hydraulic pump is smaller by a predetermined flow rate than a total amount of the flow rates instructed by said plurality of flow rate instructing means, wherein said second control means includes deviation output means for outputting a value corresponding to said predetermined flow rate as a reference deviation; and wherein said deviation output means includes means for determining one of said plurality of hydraulic actuators which is subjected to a maximum load pressure, means for selecting one of the flow rates instructed by said flow rate instructing means which corresponds to said hydraulic actuator subjected to the maximum load pressure, and means for determining said reference deviation depending on said selected instructed flow rate.

4. A hydraulic drive system comprising a variable displacement hydraulic pump, a plurality of hydraulic actuators connected to said hydraulic pump in parallel, a plurality of flow control valves for respectively driving said plurality of hydraulic actuators, and a plurality of flow rate instructing means for instructing respective flow rates to said plurality of flow control valves, said system further comprising:

a plurality of flow rate sensor means for detecting respective flow rates supplied to said plurality of hydraulic actuators;

first control means for respectively controlling said plurality of flow control valves so that the flow rates detected by said plurality of flow rate sensor means are coincident with the flow rates instructed by said plurality of flow rate instructing means; and second control means for controlling a delivery rate of said hydraulic pump by using flow rate deviations resulting from respectively subtracting the flow rates detected by said plurality of flow rate sensor means from the flow rates instructed by said plurality of flow rate instructing means such that the delivery rate of said hydraulic pump is smaller by a predetermined flow rate than a total amount of the flow rates instructed by said plurality of flow rate instructing means, wherein said second control means comprises integration means for calculating a target displacement volume of said hydraulic pump depending upon a difference between a total of said flow rate deviations and said predetermined flow rate, means for calculating the total amount of the flow rates instructed by said plurality of flow rate instructing means, means for calculating a modification value for said target displacement volume based on the total of said instructed flow rates, and means for adding said modification value to the target displacement volume calculated by said integration means and calculating a final target displacement volume.

5. A hydraulic drive system comprising a variable displacement hydraulic pump, a plurality of hydraulic actuators connected to said hydraulic pump in parallel, a plurality of flow control valves for respectively driving said plurality of hydraulic actuators, and a plurality of flow rate instructing means for instructing respective flow rates to said plurality of flow control valves, said system further comprising:

a plurality of flow rate sensor means for detecting respective flow rates supplied to said plurality of hydraulic actuators;

first control means for respectively controlling said plurality of flow control valves so that the flow rates detected by said plurality of flow rate sensor means are coincident with the flow rates instructed by said plurality of flow rate instructing means; and second control means for controlling a delivery rate of said hydraulic pump by using flow rate deviations resulting from respectively subtracting the flow rates detected by said plurality of flow rate sensor means from the flow rates instructed by said plurality of flow rate instructing means such that the delivery rate of said hydraulic pump is smaller by a predetermined flow rate than a total amount of the flow rates instructed by said plurality of flow rate instructing means, wherein said second control means comprises means for selecting a maximum value of said flow rate deviations and controlling the delivery rate of said hydraulic pump dependent upon a difference between the maximum value of said flow rate deviations and said predetermined flow rate whereby the delivery rate of the hydraulic pump is controlled to be smaller by said predetermined flow rate than the total amount of the flow rates instructed by said plurality of flow rate instructing means.

* * * * *